United States Patent
Hou et al.

(10) Patent No.: US 10,104,599 B2
(45) Date of Patent: Oct. 16, 2018

(54) DEVICE BINDING METHODS AND APPARATUSES

(71) Applicant: Xiaomi Inc., Beijing (CN)

(72) Inventors: Enxing Hou, Beijing (CN); Deguo Meng, Beijing (CN); Benchang Su, Beijing (CN)

(73) Assignee: Xiaomi Inc., Beijing (CN)

( * ) Notice: Subject to any disclaimer, the term of this patent is extended or adjusted under 35 U.S.C. 154(b) by 100 days.

(21) Appl. No.: 15/376,879

(22) Filed: Dec. 13, 2016

(65) Prior Publication Data

US 2017/0171802 A1 Jun. 15, 2017

(30) Foreign Application Priority Data

Dec. 14, 2015 (CN) .......................... 2015 1 0924049

(51) Int. Cl.
*H04W 48/16* (2009.01)
*H04W 8/18* (2009.01)
*H04W 48/20* (2009.01)
*H04W 88/08* (2009.01)

(52) U.S. Cl.
CPC ............. *H04W 48/16* (2013.01); *H04W 8/18* (2013.01); *H04W 48/20* (2013.01); *H04W 88/08* (2013.01)

(58) Field of Classification Search
CPC ....... H04W 48/16; H04W 48/20; H04W 8/18; H04W 88/08
See application file for complete search history.

(56) References Cited

U.S. PATENT DOCUMENTS

2006/0173974 A1* 8/2006 Tang .................... H04L 63/029
709/217
2008/0229086 A1* 9/2008 Ferlitsch ............. G06F 9/44521
713/1
(Continued)

FOREIGN PATENT DOCUMENTS

CN 103177372 A 6/2013
CN 103714470 A 4/2014
(Continued)

OTHER PUBLICATIONS

International Search Report dated Aug. 31, 2016 in corresponding International application No. PCT/CN2016/097724 (12 pages).
(Continued)

*Primary Examiner* — Brian D Nguyen
(74) *Attorney, Agent, or Firm* — Finnegan, Henderson, Farabow, Garrett & Dunner LLP (57) ABSTRACT

A server includes a processor and a memory storing instructions executable by the processor. The processor is configured to receive a device identification of a smart device and a user identification of a user owning the smart device from the smart device; determine whether there is a temporary binding relation between the device identification and the user identification according to a preconfigured temporary binding relation, the preconfigured temporary binding relation being configured after the server detects a designated operation on a device transaction page; and when there is a temporary binding relation between the device identification and the user identification, bind the device identification and the user identification.

5 Claims, 10 Drawing Sheets

(56) References Cited

U.S. PATENT DOCUMENTS

| | | | |
|---|---|---|---|
| 2015/0127853 A1* | 5/2015 | Roskind | H04L 61/2503 709/245 |
| 2015/0282223 A1 | 10/2015 | Wang et al. | |
| 2015/0295885 A1* | 10/2015 | Congdon | H04L 61/2557 370/392 |
| 2015/0356560 A1 | 12/2015 | Shastry et al. | |
| 2016/0255490 A1* | 9/2016 | Mufti | H04L 65/1016 370/328 |
| 2016/0277236 A1 | 9/2016 | Chen et al. | |
| 2016/0381009 A1* | 12/2016 | Liou | H04L 63/0838 726/7 |

FOREIGN PATENT DOCUMENTS

| | | |
|---|---|---|
| CN | 104780155 A | 7/2015 |
| CN | 104915225 A | 9/2015 |
| CN | 105141600 A | 12/2015 |
| CN | 105450655 A | 3/2016 |

OTHER PUBLICATIONS

Extended European Search Report of European Patent Application No. 16203666.9 issued by the European Patent Office dated May 4, 2017.

* cited by examiner

DEVICE BINDING METHODS AND APPARATUSES

CROSS-REFERENCE TO RELATED APPLICATION

This application is based on and claims the priority of the Chinese patent application No. 201510924049.0, filed on Dec. 14, 2015, which is incorporated herein by reference in its entirety.

TECHNICAL FIELD

The present disclosure is related to the field of wireless communication technologies and, more particularly, to device binding methods and apparatuses.

BACKGROUND

With development of wireless communication technologies, more and more WiFi (Wireless Fidelity) smart devices and Bluetooth smart devices are used at consumers' homes. To ensure security of a smart device, after the smart device accesses a network, a binding relation needs to be established between the smart device and a user identification. In this way, only a user owning the smart device can remotely operate the smart device or check its state.

In related arts, after a smart device accesses a network, it usually needs to perform some special operations in order to bind the smart device with a user identification. For example, after the smart device accesses the network, a designated application installed in a terminal displays a binding button for binding the smart device. After detecting a click operation on the binding button by a user, a binding request is sent to a server. Then, the user also needs to press a physical button on the smart device for confirming the binding within a designated period, so as to trigger the smart device to send a binding confirmation message to the server. If the server receives the binding confirmation message for the binding request within the designated period, it binds the device identification of the smart device with the user identification.

SUMMARY

Embodiments of the present disclosure provide a device binding method to solve the problems in the related arts.

According to a first aspect of the present disclosure, there is provided a server including a processor and a memory storing instructions executable by the processor, wherein the processor is configured to: receive a device identification of a smart device and a user identification of a user owning the smart device from the smart device; determine whether there is a temporary binding relation between the device identification and the user identification according to a preconfigured temporary binding relation, the preconfigured temporary binding relation being configured after the server detects a designated operation on a device transaction page, and when there is a temporary binding relation between the device identification and the user identification, bind the device identification and the user identification.

According to a second aspect of the present disclosure, there is provided a smart device including a processor and a memory storing instructions executable by the processor, wherein the processor is configured to: establish a connection with an access point according to connection information of the access point; acquire a device identification of the smart device and a user identification of a user owning the smart device; and send the device identification and the user identification to a server through the established connection. The server is configured to bind the device identification and the user identification after determining that there is a temporary binding relation between the device identification and the user identification. The temporary binding relation is configured by the server after the server detects a designated operation on a device transaction page.

According to a third aspect of the present disclosure, there is provided a terminal including a processor and a memory storing instructions executable by the processor, wherein the processor is configured to: start a designated application when detecting an operation of invoking the designated application; display a device list via the designated application, the device list including one or more detected smart devices; and send, to a designated smart device, connection information of an access point, when detecting a selection of the designated smart device from the device list. The designated smart device is configured to establish a connection with the access point according to the connection information and send a device identification of the designated smart device and a user identification of a user owning the designated smart device to a server through the established connection, such that the server binds the device identification and the user identification after determining that there is a temporary binding relation between the device identification and the user identification.

It should be understood that both the foregoing general description and the following detailed description are only exemplary and explanatory and are not restrictive of the disclosure.

BRIEF DESCRIPTION OF THE DRAWINGS

The accompanying drawings herein, which are incorporated into and constitute a part of the description, illustrate the embodiments according to the present disclosure and serve to explain the principles of the present disclosure together with the description.

The above accompanying drawings illustrate specific embodiments of the disclosure, which will be described in detail hereinafter. These drawings and description are not intended to limit the scope of the concept of the disclosure in any manner, but to explain the concept of the disclosure to those skilled in the art with reference to the specific embodiments.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise indicated. The implementations set forth in the following description of exemplary embodiments do not represent all implementations consistent with the disclosure. Instead, they are merely examples of devices and methods consistent with aspects related to the disclosure as recited in the appended claims.

Figure 1:
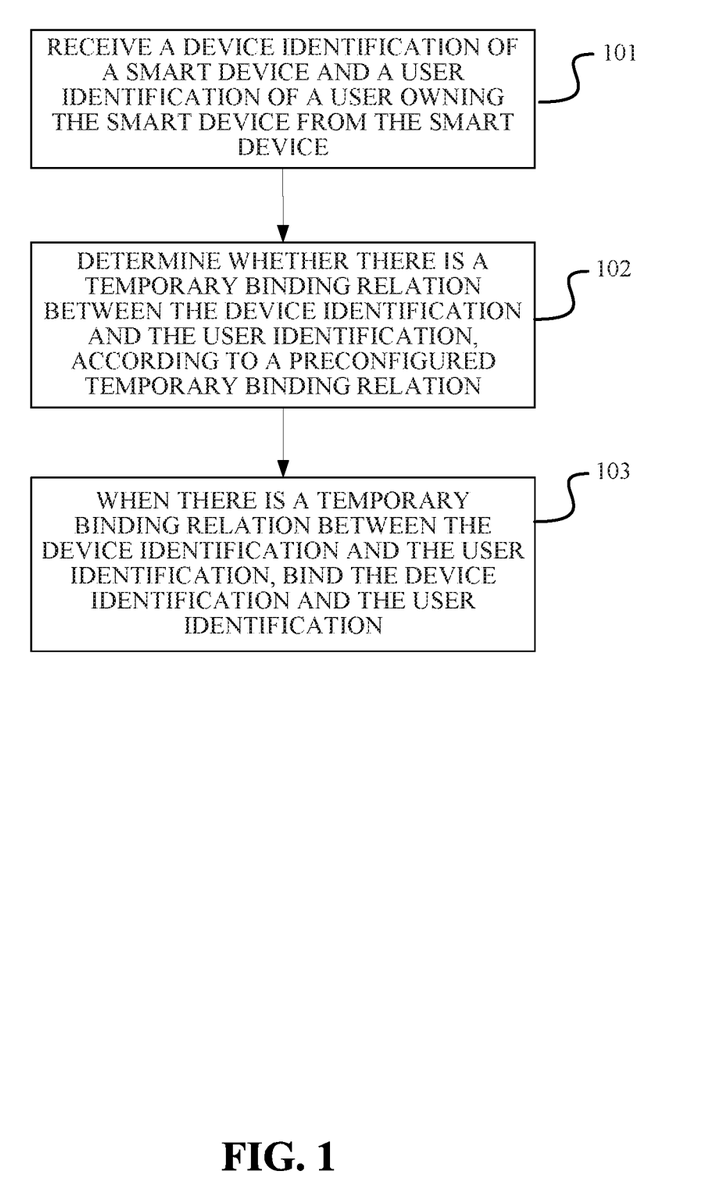
FIG. 1 is a flowchart showing a device binding method according to an exemplary embodiment of the disclosure.

FIG. 1 is a flowchart showing a device binding method according to an exemplary embodiment of the disclosure. The method may be implemented in (e.g., performed by) a server. The method includes steps 101-103.

In step 101, a device identification of a smart device and a user identification of a user owning the smart device are received from the smart device.

In step 102, it is determined whether there is a temporary binding relation between the device identification and the user identification according to a preconfigured temporary binding relation. When there is a temporary binding relation between the device identification and the user identification, step 103 is executed.

In exemplary embodiments, the temporary binding relation is configured by the server after the server detects a designated operation on a device transaction page.

In step 103, when there is a temporary binding relation between the device identification and the user identification, the device identification and the user identification are bound.

In the device binding method of this embodiment, after receiving a device identification of a smart device and a user identification of a user owning the smart device from the smart device, the server determines whether there is a temporary binding relation between the device identification and the user identification according to a preconfigured temporary binding relation. When there is a temporary binding relation between the device identification and the user identification, the server binds the device identification and the user identification. The temporary binding relation is configured by the server after the server detects a designated operation on a device transaction page. Because the server can directly bind the device identification and the user identification according to the preconfigured temporary binding relation between the device identification and the user identification, the user does not need to perform other operations on a terminal or the smart device, thereby simplifying the binding process.

Optionally, the method includes, when detecting a value transfer operation associated with the smart device, displaying on the device transaction page a temporary binding triggering option for prompting temporary binding of the device identification and the user identification. The method also includes, when detecting a selection of the temporary binding triggering option by the user owning the smart device, storing the temporary binding relation between the device identification and the user identification.

The above optional technical solutions may be combined in various manners to form optional embodiments of the present disclosure, which are not described herein one by one.

Figure 2:
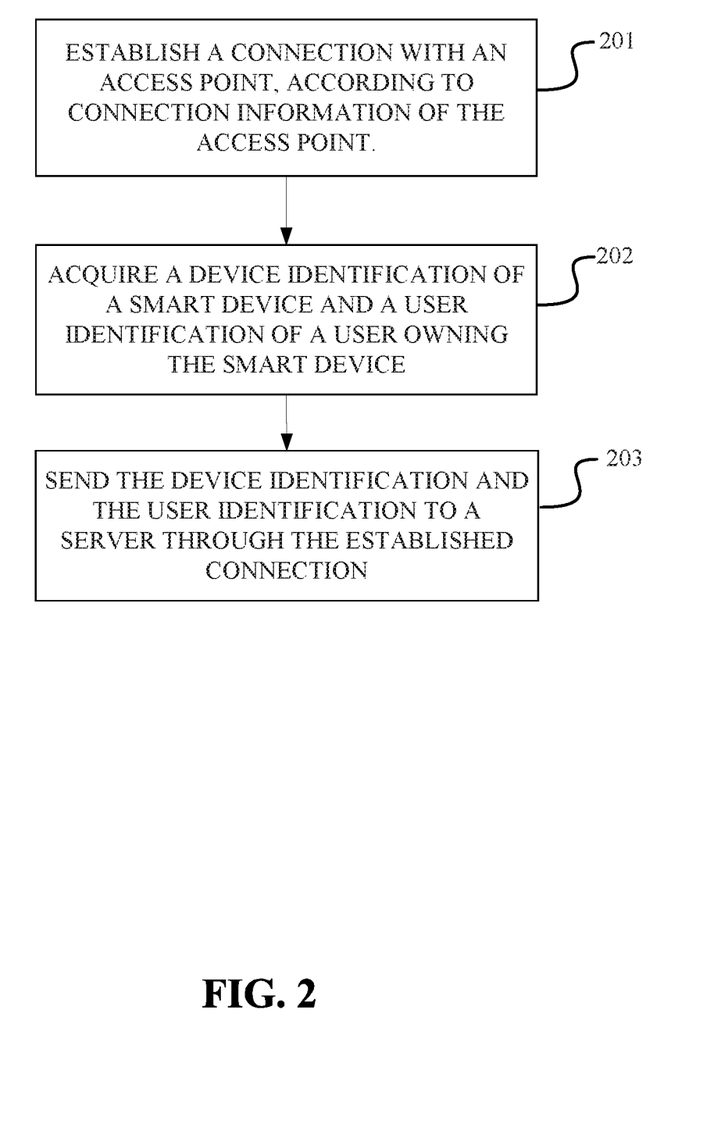
FIG. 2 is a flowchart showing a device binding method according to another exemplary embodiment of the disclosure.

FIG. 2 is a flowchart showing a device binding method according to another exemplary embodiment of the disclosure. The method may be implemented in (e.g., performed by) a smart device. The method includes steps 201-203.

In step 201, a connection with an access point is established according to connection information of the access point.

In step 202, a device identification of the smart device and a user identification of a user owning the smart device are acquired.

In step 203, the device identification and the user identification are sent to a server through the established connection.

The server is configured to bind the device identification and the user identification after determining that there is a temporary binding relation between the device identification and the user identification. The temporary binding relation is configured by the server after the server detects a designated operation on a device transaction page.

In the device binding method of this embodiment, after establishing a connection with an access point according to connection information of the access point, the smart device acquires a device identification of the smart device and a user identification of a user owning the smart device, and sends the device identification and the user identification to the server through the established connection. After determining that there is a temporary binding relation between the device identification and the user identification, the server binds the device identification and the user identification. For example, the temporary binding relation is configured by the server after the server detects a designated operation on a device transaction page. Because the server can directly bind the device identification and the user identification according to the preconfigured temporary binding relation between the device identification and the user identification, the user does not need to perform other operations on a terminal or the smart device, thereby simplifying the binding process.

Optionally, acquiring the user identification of the user owning the smart device includes receiving the user identification of the user owning the smart device sent by a terminal via a designated application. The designated application manages multiple detected smart devices.

The above optional technical solutions may be combined in various manners to form optional embodiments of the present disclosure, which are not described herein one by one.

Figure 3:
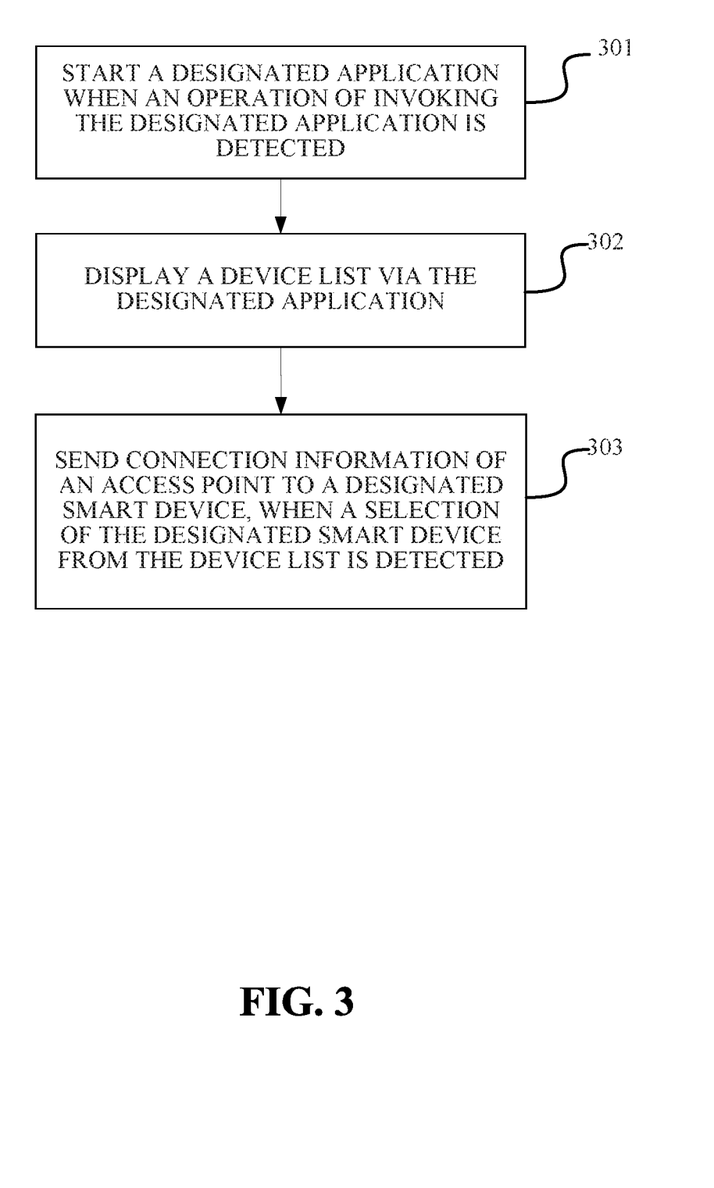
FIG. 3 is a flowchart showing a device binding method according to yet another exemplary embodiment of the disclosure.

FIG. 3 is a flowchart showing a device binding method according to yet another exemplary embodiment of the disclosure. The method may be implemented in (e.g., performed by) a terminal. The method includes steps 301-303.

In step 301, a designated application is started when an operation of invoking the designated application is detected.

In step 302, a device list is displayed via the designated application.

The device list includes multiple detected smart devices.

In step 303, connection information of an access point is sent to a designated smart device, when a selection of the designated smart device from the device list is detected.

The designated smart device is configured to establish a connection with the access point according to the connection information and send a device identification of the designated smart device and a user identification of a user owning the designated smart device to a server through the established connection, such that the server binds the device identification and the user identification after determining that there is a temporary binding relation between the device identification and the user identification.

In the device binding method of this embodiment, after detecting an operation of invoking the designated application, the terminal starts the designated application. A device list is displayed via the designated application. The terminal sends connection information of an access point to a designated smart device when detecting a selection of the designated smart device from the device list, such that the designated smart device establishes a connection with the access point according to the connection information, and sends the device identification of the designated smart device and the user identification of the user owning the designated smart device to a server through the established connection. Then, the server binds the device identification and the user identification after determining that there is a temporary binding relation between the device identification and the user identification. The temporary binding relation is configured by the server after the server detects a designated operation on a device transaction page. Because the server can directly bind the device identification and the user identification according to the preconfigured temporary binding relation between the device identification and the user identification, the user does not need to perform other operations on a terminal or the smart device, thereby simplifying the binding process.

The above optional technical solutions may be combined in various manners to form optional embodiments of the present disclosure, which are not described herein one by one.

Figure 4:
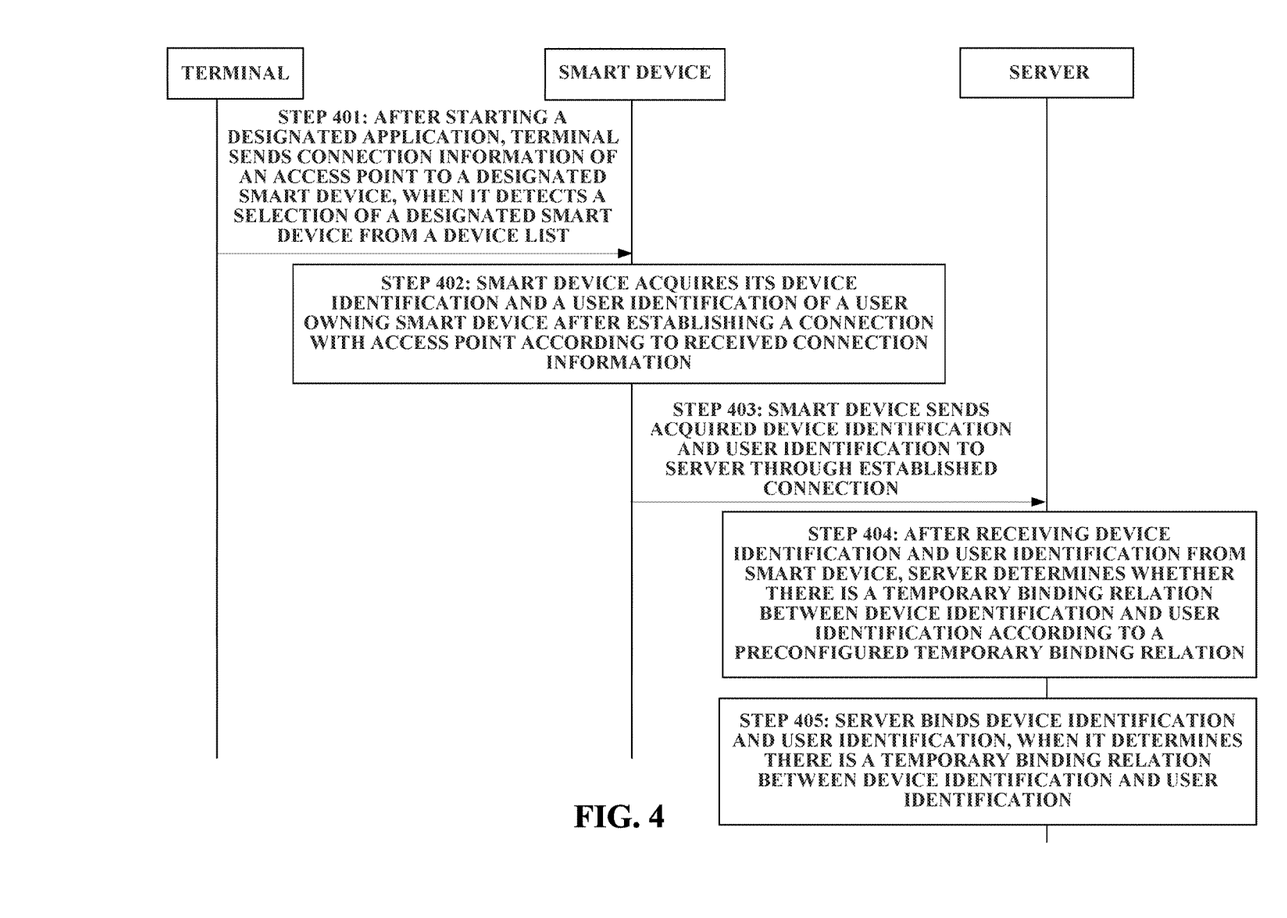
FIG. 4 is a flowchart showing a device binding method according to yet another exemplary embodiment of the disclosure.

FIG. 4 is a flowchart showing a device binding method according to yet another exemplary embodiment of the disclosure. As shown in FIG. 4, the method includes steps 401-405.

In step 401, after starting a designated application, a terminal sends connection information of an access point to a designated smart device, when it detects a selection of a designated smart device from a device list.

The terminal may be a smart phone, a tablet computer, or the like, and the smart device may be a smart household appliance, such as a smart refrigerator, a smart camera, a smart washing machine, a smart TV, or a smart illuminating lamp. In the terminal, the designated application such as a smart home APP (Application) is installed and configured to manage and control smart devices. A user may download an installation package of the designated application from a corresponding website and install the designated application in the terminal, prior to controlling the smart device by the terminal. After the user installs the designated application in the terminal, the terminal determines that an operation of invoking the application is detected, when the user clicks an application icon of the designated application or searches for the designated application via voice. Then, the terminal attempts to start the application.

In exemplary embodiments, after the application is started successfully, the user inputs a registered user account and a password on a login interface to log into the designated application. Then, the terminal scans for surrounding smart devices using the designated application. When a smart device is detected in the scanning, the terminal adds the smart device to a device list so as to manage the smart device. In the device list, information entries corresponding to the multiple scanned smart devices are displayed. If the user desires to control a certain smart device using the designated application, the user can select the smart device in the device list to connect the smart device to the Internet. After the smart device connects to the Internet, the terminal can control the smart device via the designated application. When detecting a selection of an information entry corresponding to a certain smart device from the device list, the terminal acquires connection information of an access point, and sends the connection information to the smart device via WiFi, Bluetooth technology, or near field communication technology, which is not specifically limited in the present disclosure. The connection information of the access point may include a name of the access point and a connection password. The access point may be a router, a switch, or the like near the smart device, and is not specifically limited in the present disclosure. For example, for a smart household appliance, the access point may be an access point provided in the home.

In some embodiments, after being powered on, a smart device may broadcast to its vicinity a broadcast message carrying the name of the smart device via a built-in Bluetooth module or near field communication technology. If the terminal receives the broadcast message via the designated application, the terminal determines that the smart device is detected in the scanning. The broadcast message may be a Bluetooth signal, a near field communication signal, or the like, which is not specifically limited in the present disclosure.

In step 402, the smart device acquires its device identification and a user identification of a user owning the smart device after establishing a connection with the access point according to the received connection information.

A smart device can be uniquely determined according to its device identification. The device identification may be an MAC (Media Access Control) address of the smart device or the like, which is not specifically limited in the present disclosure. A user can be uniquely determined according to a user identification. The user identification may be a user account for the user to log into the designated application. For example, the user account may be a mail account, a phone number or the like, which is not specifically limited in the present disclosure.

In an embodiment of the present disclosure, when the smart device receives connection information of the access point via the Bluetooth module, it establishes a connection with the access point according to the name of the access point and the connection password included in the connection information. After the smart device establishes the connection with the access point, a connection success prompt may be displayed via the designated application installed in the terminal. For example, the prompt may include a text message (e.g., "Congratulations! A smart socket has successfully connected to the access point") or a corresponding voice prompt, which is not specifically limited in the present disclosure. The terminal sends the user identification of the user owning the device to the smart device via the designated application. The user owning the device is a user who logs into the designated application. After receiving the user identification, the smart device acquires its device identification and subsequently sends both the device identification and the user identification to a server.

In some embodiments, when sending the connection information of the access point to the smart device, the terminal may also carry therein the user identification of the user owning the device. The smart device may receive the connection information and the user identification simultaneously. After successfully establishing a connection with the access point according to the connection information, the smart device directly acquires its device identification and subsequently sends the device identification and the user identification to the server.

In step 403, the smart device sends the acquired device identification and user identification to the server through the established connection.

In an embodiment of the present disclosure, the smart device sends the acquired device identification and user identification to the server, such that the server completes binding of the user identification and the device identification. In some embodiments, the user may perform a control operation on the smart device via the designated application. For example, when the smart device is a smart illuminating lamp, the user may perform operations (such as "power on", "power off," and "adjust brightness") on the smart illuminating lamp through a control interface provided via the designated application for controlling the smart illuminating lamp.

In step 404, after receiving the device identification and the user identification from the smart device, the server determines whether there is a temporary binding relation between the device identification and the user identification according to a preconfigured temporary binding relation. When there is a temporary binding relation between the device identification and the user identification, step 405 is performed.

In an embodiment of the present disclosure, the user may purchase the smart device on a device transaction page provided by a vendor's official website or a third-party transaction platform. For both the official website and the third-party transaction platform, a transaction of the smart device may be accomplished after the user enters a login account and/or a login password. The transaction process may be performed on a computer or a handset, which is not specifically limited in the present disclosure. If the user triggers a value transfer operation on the device transaction page after selecting the smart device to be purchased, the user may be asked to transfer an amount of real or virtual currency equivalent to the value of the purchased smart device from an online electronic banking account associated with the user to the vendor's account. In some embodiments, in order to simplify the traditional process of binding the smart device and the user identification and avoid excessive participation of the user in the device binding process, the present disclosure provides a mechanism for setting a temporary binding relation at the smart device transaction stage. For example, a temporary binding triggering option may be displayed on the device transaction page. The temporary binding triggering option is configured to prompt the user to temporarily bind the device identification of the smart device to be purchased and the user identification.

The temporary binding triggering option may be a selectable button labeled with text information, e.g., "Intend to bind the device to the user identification." For example, when the user identification is the user account, if the selectable button is selected by the user through a corresponding click operation, by default, the server temporarily binds the user account currently logged in on the current transaction page and the device identification of the purchased device. In some embodiments, in addition to the above binding process, the temporary binding triggering option further supports manual input of the user account to be bound. For example, a binding information input box may be added near the selectable button to enable the user to input the user account to be bound. If the selectable button is selected and information input to the binding information input box is detected, the input information in the input box is temporarily bound with the device identification. The form of the temporary binding triggering option is not specifically limited in the present disclosure.

The user identification that establishes a temporary binding relation with the smart device needs to be consistent with the user identification logged in in the designated application. However, a login account for the user that is used to log into the transaction page may be consistent or inconsistent with the user identification that establishes the temporary binding relation with the smart device, which is not specifically limited in the present disclosure.

After the value transfer operation is completed, the user acquires the ownership of the smart device. When the user clicks the temporary binding triggering option, the server determines that a selection of the temporary binding triggering option by the user is detected. Then, the server stores a correspondence between the device identification and the user identification in a temporary binding relation list. As such, after subsequently receiving a device identification and a user identification sent by a smart device, the server searches the temporary binding list to determine whether there is a temporary binding relation between the device identification and the user identification in the temporary binding relation list. If the server determines that there is a temporary binding relation between the device identification and the user identification, step 405 is performed.

In step 405, the server binds the device identification and the user identification, when it determines that there is a temporary binding relation between the device identification and the user identification.

In one embodiment, after determining that there is a temporary binding relation between the device identification and the user identification sent by the smart device, the server binds the device identification and the user identification, and establishes a binding relation (e.g., a permanent binding relation) between the device identification and the user identification. After the successful binding, the server sends a binding success message to the terminal. After receiving the binding success message, the terminal displays binding success information in the form of text on a display interface of the designated application, or directly outputs binding success information in the form of voice, which is not specifically limited in the present disclosure. After the device binding is completed, the user can check the state of the smart device through a control interface of the designated application configured for controlling the smart device, and control the smart device via the control interface. For example, after a smart camera is successfully bound, the user can check the current state (such as the on/off state) of the camera through a control interface of the designated application configured for controlling the smart camera, and perform operations on the camera (such as powering on, powering off, adjusting photographing direction, zooming in/out, etc.).

In some embodiments, if the server fails to bind the device identification and the user identification, the server sends a binding failure message to the terminal. After receiving the binding failure message, the terminal displays a rebinding option on an application interface. The rebinding option may be displayed on an information entry corresponding to the smart device in the device list. The rebinding option may include text information (e.g., "Binding failed. Rebind or not?") and a button or a check box configured to trigger a rebinding operation, which is not specifically limited in the present disclosure.

With the device binding method of this embodiment, after establishing a connection with an access point according to connection information sent by the terminal, the smart device acquires a device identification of the smart device and a user identification of a user owning the smart device, and sends the acquired device identification and user identification to a server. The server determines whether there is a temporary binding relation between the device identification and the user identification according to a preconfigured temporary binding relation. After determining that there is a temporary binding relation between the device identification and the user identification, the server binds the device identification and the user identification. The temporary binding relation is configured by the server after the server detects a designated operation on a device transaction page. Because the server can directly bind the device identification and the user identification according to the preconfigured temporary binding relation between the device identification and the user identification, the user does not need to perform other operations on a terminal or the smart device, thereby simplifying the binding process.

Figure 5:
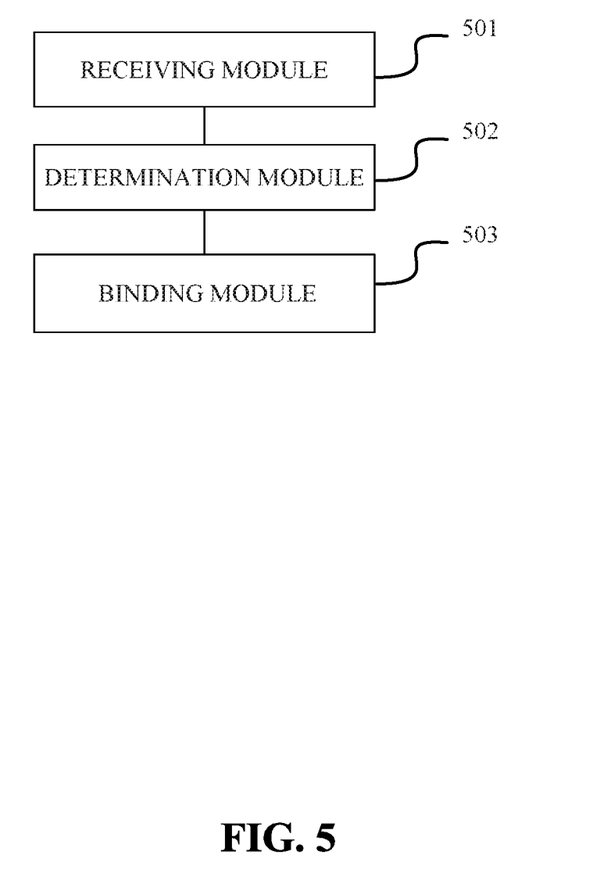
FIG. 5 is a block diagram of a device binding apparatus according to an exemplary embodiment of the disclosure.

FIG. 5 is a block diagram of a device binding apparatus according to an embodiment of the disclosure. For example, the device binding apparatus is a part of a server or the server. As show in FIG. 5, the apparatus includes a receiving module 501, a determination module 502, and a binding module 503.

The receiving module 501 is connected with the determination module 502 and is configured to receive a device identification of a smart device and a user identification of a user owning the smart device from the smart device. The determination module 502 is connected with the binding module 503 and is configured to determine whether there is a temporary binding relation between the device identification and the user identification according to a preconfigured temporary binding relation. The temporary binding relation is configured by the device binding apparatus after the device binding apparatus detects a designated operation on a device transaction page. The binding module 503 is configured to bind the device identification and the user identification when there is a temporary binding relation between the device identification and the user identification.

Figure 6:
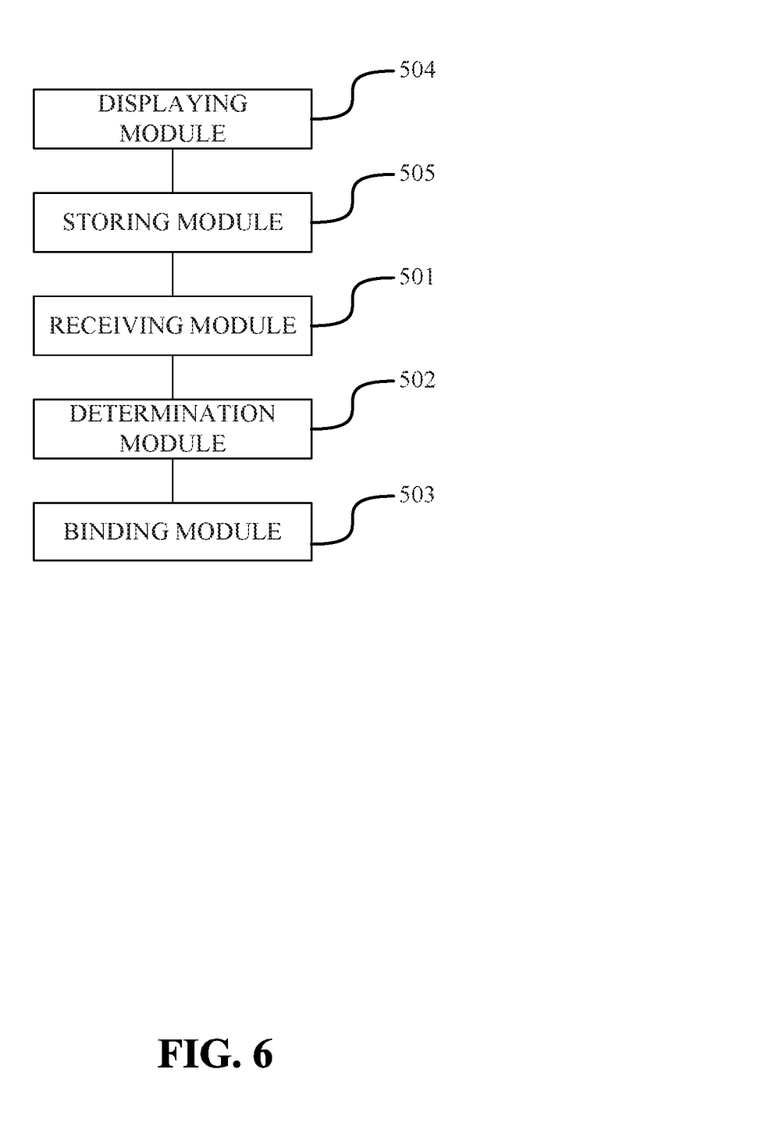
FIG. 6 is a block diagram of a device binding apparatus according to another exemplary embodiment of the disclosure.

FIG. 6 shows an exemplary device binding apparatus according to another embodiment of the disclosure. As shown in FIG. 6, the device binding apparatus includes the modules 501-503, and further includes a displaying module 504. The displaying module 504 is configured to, when a value transfer operation associated with the smart device is detected, display on the device transaction page a temporary binding triggering option for prompting temporary binding of the device identification and the user identification. The device binding apparatus also includes a storing module 505 configured to, when a selection of the temporary binding triggering option by the user owning the smart device is detected, store the temporary binding relation between the device identification and the user identification.

According to the device binding apparatus of this embodiment, after receiving a device identification of a smart device and a user identification of a user owning the smart device from the smart device, the device binding apparatus determines whether there is a temporary binding relation between the device identification and the user identification according to a preconfigured temporary binding relation. When there is a temporary binding relation between the device identification and the user identification, the device binding apparatus binds the device identification and the user identification. The temporary binding relation is configured by the device binding apparatus after the device binding apparatus detects a designated operation on a device transaction page. Because the device binding apparatus can directly bind the device identification and the user identification according to the preconfigured temporary binding relation between the device identification and the user identification, the user does not need to perform other operations on a terminal or the smart device, thereby simplifying the binding process.

Figure 7:
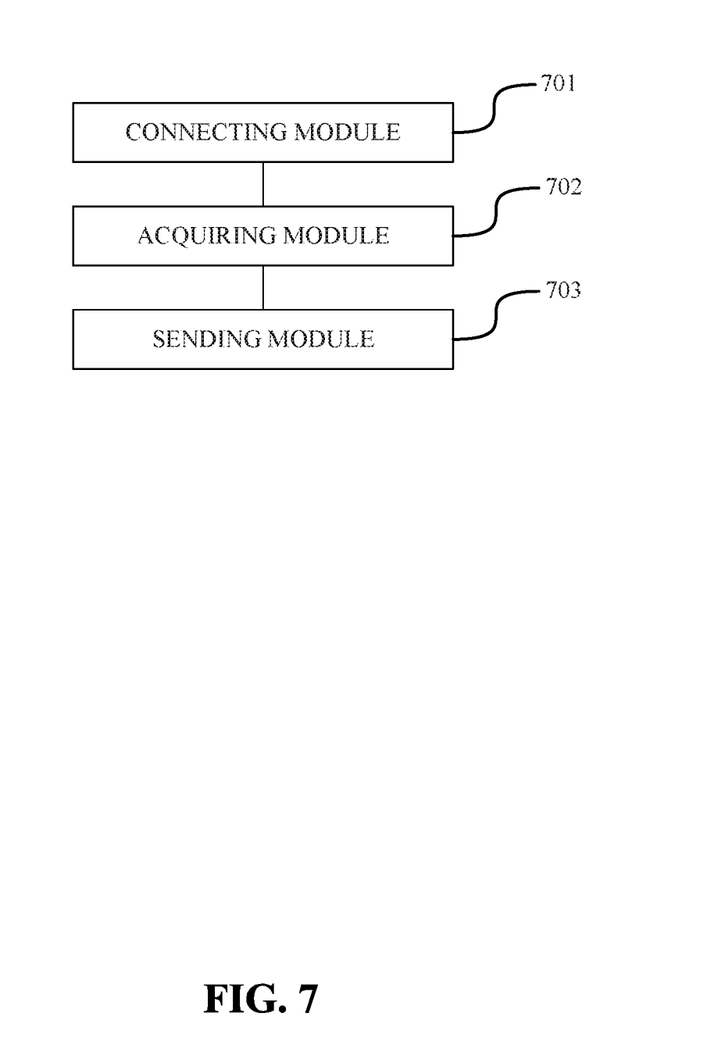
FIG. 7 is a block diagram of a device binding apparatus according to yet another exemplary embodiment of the disclosure.

FIG. 7 is a block diagram of a device binding apparatus according to yet another embodiment of the disclosure. For example, the device binding apparatus is a part of a smart device or the smart device.

As shown in FIG. 7, the device binding apparatus includes a connecting module 701, an acquiring module 702, and a sending module 703.

The connecting module 701 is connected to the acquiring module 702 and is configured to establish a connection with an access point according to connection information of the access point. The acquiring module 702 is connected to the sending module 703 and is configured to acquire a device identification of a smart device and a user identification of a user owning the smart device. The sending module 703 is configured to send the device identification and the user identification to a server through the established connection. The server is configured to bind the device identification and the user identification after determining that there is a temporary binding relation between the device identification and the user identification. The temporary binding relation is configured by the server after the server detects a designated operation on a device transaction page.

Optionally, the acquiring module 702 is configured to receive the user identification of the user owning the smart device sent by a terminal via a designated application, the designated application managing multiple detected smart devices.

According to the device binding apparatus of this embodiment, after establishing a connection with an access point according to connection information of the access point, a device identification of the smart device and a user identification of a user owning the smart device are acquired and the device identification and the user identification are sent to the server through the established connection. After the server determines that there is a temporary binding relation between the device identification and the user identification, the server binds the device identification and the user identification. The temporary binding relation is configured by the server after the server detects a designated operation on a device transaction page. Because the server can directly bind the device identification and the user identification according to the preconfigured temporary binding relation between the device identification and the user identification, the user does not need to perform other operations on a terminal or the smart device, thereby simplifying the binding process.

Figure 8:
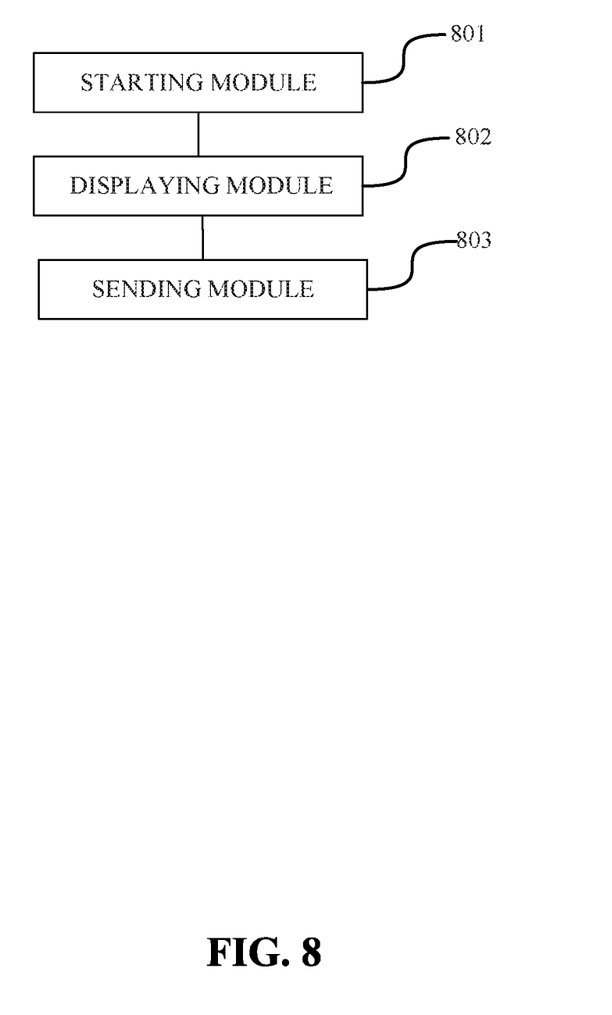
FIG. 8 is a block diagram of a device binding apparatus according to yet another exemplary embodiment of the disclosure.

FIG. 8 is a block diagram of a device binding apparatus according to yet another embodiment of the disclosure. For example, the device binding apparatus is a part of a terminal or the terminal.

As shown in FIG. 8, the apparatus includes a starting module 801, a displaying module 802, and a sending module 803.

The starting module 801 is connected to the displaying module 802 and is configured to start a designated application when an operation of invoking the designated application is detected. The displaying module 802 is connected to the sending module 803 and is configured to display a device list via the designated application, the device list including multiple detected smart devices. The sending module 803 is configured to send, to a designated smart device, connection information of an access point, when a selection of the designated smart device from the device list is detected. The designated smart device is configured to establish a connection with the access point according to the connection information and send a device identification of the designated smart device and a user identification of a user owning the designated smart device to a server through the established connection, such that the server binds the device identification and the user identification after determining that there is a temporary binding relation between the device identification and the user identification.

According to the device binding apparatus of this embodiment, after detecting an operation of invoking the designated application, the designated application is started. A device list is displayed via the designated application. Connection information of an access point is sent to a designated smart device when detecting a selection of the designated smart device from the device list, such that the designated smart device establishes a connection with the access point according to the connection information and sends the device identification of the designated smart device and the user identification of the user owning the designated smart device to a server through the established connection. Then, the device identification and the user identification are bound after the server determines that there is a temporary binding relation between the device identification and the user identification. The temporary binding relation is configured by the server after the server detects a designated operation on a device transaction page. Because the server can directly bind the device identification and the user identification according to the preconfigured temporary binding relation between the device identification and the user identification, the user does not need to perform other operations on a terminal or the smart device, thereby simplifying the binding process.

Regarding the disclosed device binding apparatuses, the specific manners in which respective modules of the apparatuses perform operations have been described in detail in the descriptions of the disclosed methods.

Figure 9:
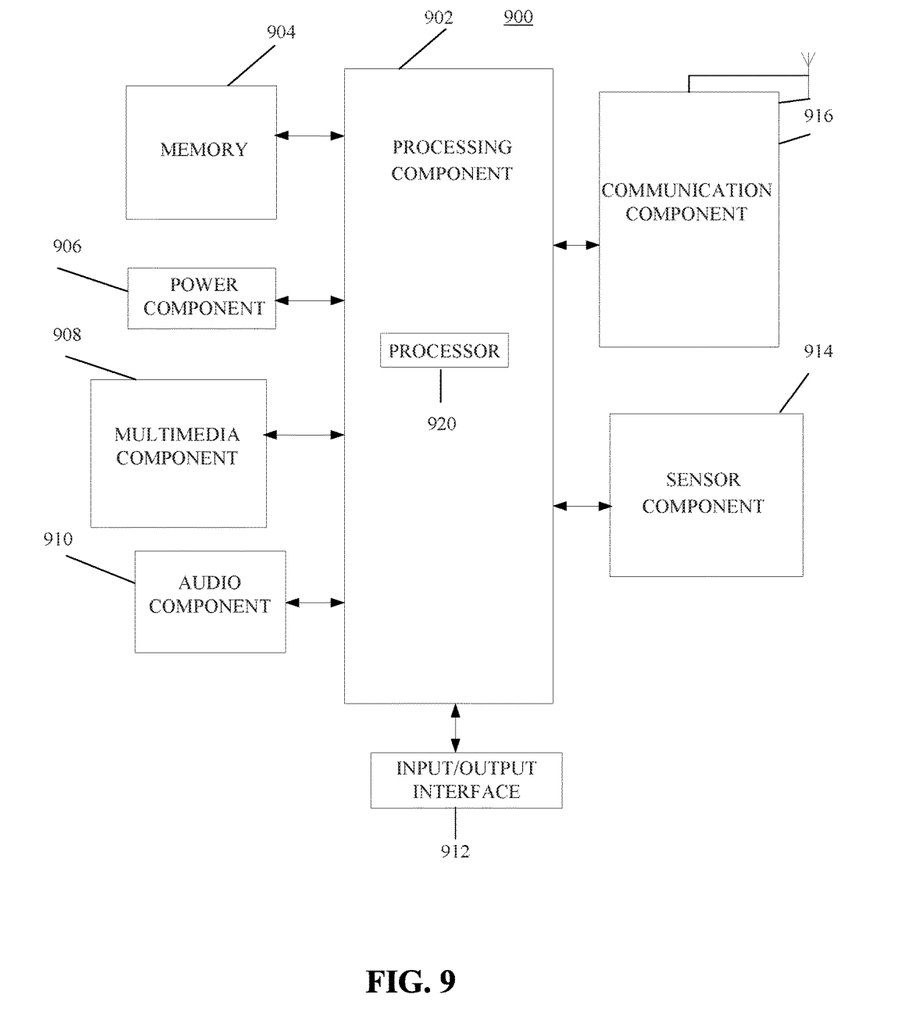
FIG. 9 is a block diagram of a device binding apparatus according to yet another exemplary embodiment of the disclosure.

FIG. 9 is a block diagram of a device binding apparatus 900 according to yet another embodiment of the disclosure. The apparatus 900 may be a terminal, such as a mobile phone, a computer, a digital broadcast terminal, a message transceiver device, a game console, a tablet device, medical equipment, fitness equipment, a personal digital assistant, or a smart device, such as a smart refrigerator, a smart camera, a smart washing machine, a smart TV, or a smart illuminating lamp.

The apparatus 900 includes one or more of the following components: a processing component 902, a memory 904, a power component 906, a multimedia component 908, an audio component 910, an input/output (I/O) interface 912, a sensor component 914, and a communication component 916.

The processing component 902 is configured to control overall operations of the apparatus 900, such as the operations associated with display, phone calls, and data communications, camera operations, and recording operations. The processing component 902 includes one or more processors 920 configured to execute instructions to perform all or part of the disclosed methods. Optionally, the processing component 902 includes one or more modules configured to facilitate the interaction between the processing component 902 and other components. For example, the processing component 902 may include a multimedia module configured to facilitate the interaction between the multimedia component 908 and the processing component 902.

The memory 904 is configured to store various types of data to support the operation of the apparatus 900. Examples of such data include instructions for any applications or methods implemented or performed by the apparatus 900, various kinds of data, messages, pictures, video, etc. The memory 904 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, or a magnetic or optical disk.

The power component 906 is configured to provide power to various components of the apparatus 900. The power component 906 may include a power management system, one or more power sources, and any other components associated with the generation, management, and distribution of power in the apparatus 900.

The multimedia component 908 includes a screen providing an output interface between the apparatus 900 and the user. In some embodiments, the screen includes a liquid crystal display and a touch panel. If the screen includes the touch panel, the screen may be implemented as a touch screen configured to receive input signals from the user. The touch panel includes one or more touch sensors configured to sense touches, swipes, and gestures on the touch panel. The touch sensors sense not only a boundary of a touch or swipe action, but also a period of time and a pressure associated with the touch or swipe action. In some embodiments, the multimedia component 908 includes a front camera and/or a rear camera. The front camera and/or the rear camera are configured to receive external multimedia data while the apparatus 900 is in an operation mode, such as a photographing mode or a video mode. Each of the front camera and the rear camera has a fixed optical lens system or has focus and optical zoom capability.

The audio component 910 is configured to output and/or input audio signals. For example, the audio component 910 may include a microphone configured to receive an external audio signal when the apparatus 900 is in an operation mode, such as a call mode, a recording mode, and a voice recognition mode. The received audio signal may be stored in the memory 904 or transmitted via the communication component 916. In some embodiments, the audio component 910 further includes a speaker configured to output audio signals.

The I/O interface 912 is configured to provide an interface between the processing component 902 and peripheral interface modules, such as a keyboard, a click wheel, buttons, and the like. The buttons may include, but are not limited to, a home button, a volume button, a starting button, and a locking button.

The sensor component 914 includes one or more sensors configured to provide status assessments of various aspects of the apparatus 900. For instance, in some embodiments, the sensor component 914 is configured to detect an open/closed status of the apparatus 900, relative positioning of components, e.g., the display and the keypad, of the apparatus 900, a change in position of the apparatus 900 or a component of the apparatus 900, presence or absence of user's contact with the apparatus 900, an orientation or an acceleration/deceleration of the apparatus 900, and a change in temperature of the apparatus 900. In some embodiments, the sensor component 914 includes a proximity sensor configured to detect the presence of nearby objects without any physical contact. In some embodiments, the sensor component 914 includes a light sensor, such as a CMOS or CCD image sensor, for use in imaging applications. In some embodiments, the sensor component 914 also includes an accelerometer sensor, a gyroscope sensor, a magnetic sensor, a pressure sensor, or a temperature sensor.

The communication component 916 is configured to facilitate wired or wireless communication between the apparatus 900 and other devices. The apparatus 900 can access a wireless network based on a communication standard, such as WiFi, 2G, 3G, 4G, or a combination thereof. In one exemplary embodiment, the communication component 916 receives a broadcast signal or broadcast associated information from an external broadcast management system via a broadcast channel. In some embodiments, the communication component 916 further includes a near field communication (NFC) module configured to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In some embodiments, the apparatus 900 is implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the disclosed methods.

In an exemplary embodiment, there is also provided a non-transitory computer-readable storage medium (for example, the memory 904) storing instructions executable by the processor 920 of the apparatus 900 for performing the disclosed methods. For example, the non-transitory computer-readable storage medium may be a ROM, a RAM, a CD-ROM, a magnetic tape, a floppy disc, an optical data storage device, and the like.

The non-transitory computer-readable storage medium has instructions stored therein that, when executed by a processor of a mobile terminal, cause the mobile terminal to perform a device binding method. The device binding method includes starting a designated application when detecting an operation of invoking the designated application. The device binding method also includes displaying a device list via the designated application, the device list including multiple detected smart devices. The device binding method also includes sending, to a designated smart device, connection information of an access point, when detecting a selection of the designated smart device from the device list. The designated smart device is configured to establish a connection with the access point according to the connection information and send a device identification of the designated smart device and a user identification of a user owning the designated smart device to a server through the established connection, such that the server binds the device identification and the user identification after determining that there is a temporary binding relation between the device identification and the user identification.

According to the non-transitory computer-readable storage medium of the present disclosure, after detecting an operation of invoking the designated application, the designated application is started. A device list is displayed via the designated application. Connection information of an access point is sent to a designated smart device when detecting a selection of the designated smart device from the device list, such that the designated smart device establishes a connection with the access point according to the connection information and sends the device identification of the designated smart device and the user identification of the user owning the designated smart device to a server through the established connection. The server binds the device identification and the user identification after determining that there is a temporary binding relation between the device identification and the user identification. The temporary binding relation is configured by the server after the server detects a designated operation on a device transaction page. Because the server can directly bind the device identification and the user identification according to the preconfigured temporary binding relation between the device identification and the user identification, the user does not need to perform other operations on a terminal or the smart device, thereby simplifying the binding process.

Figure 10:
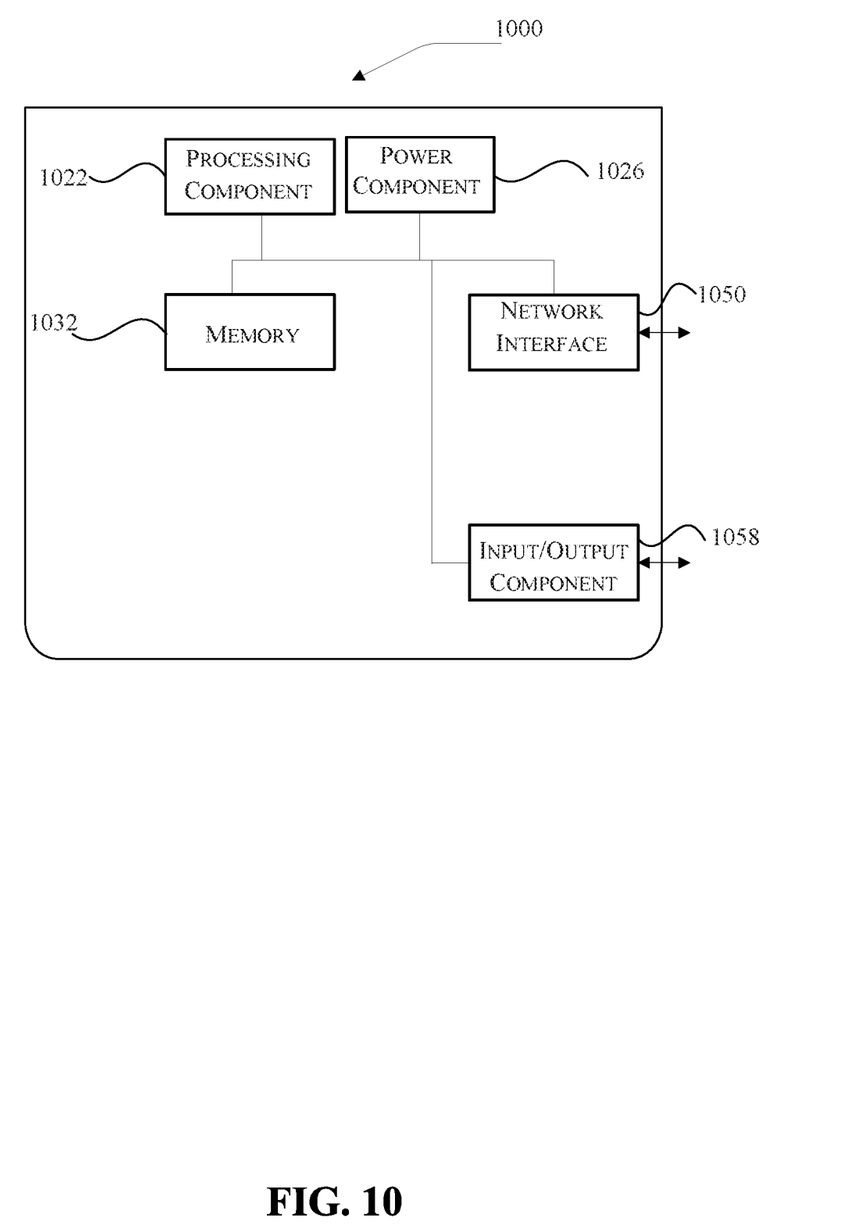
FIG. 10 is a block diagram of a device binding apparatus according to yet another exemplary embodiment of the disclosure.

FIG. 10 is a block diagram of a device binding apparatus 1000 according to yet another embodiment of the disclosure. The apparatus 1000 may be provided as a server. With reference to FIG. 10, the apparatus 1000 includes a processing component 1022, which includes one or more processors. The apparatus 1000 includes storage resources represented by a memory 1032 for storing instructions executable by the processing component 1022, such as software applications. The software applications stored in the memory 1032 may include one or more modules each corresponding to a set of instructions. In some embodiments, the processing component 1022 is configured to execute instructions to perform the disclosed methods described above as being performed by a server.

The apparatus 1000 also includes a power component 1026 configured to execute power management for the apparatus 1000. The apparatus 1000 also includes a wired or wireless network interface 1050 configured to connect the apparatus 1000 to a network, and an input/output (I/O) component 1058. The apparatus 1000 operates an operation system stored in the memory 1032, for example, Windows Server™, Mac OS X™, Unix™, Linux™, Free BSD™, or the like.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. The specification and examples are intended to be exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:
1. A server, comprising:
a processor; and
a memory storing instructions executable by the processor,
wherein the processor is configured to:

receive a device identification of a smart device and a user identification of a user owning the smart device from the smart device;

determine whether there is a temporary binding relation between the device identification and the user identification according to a preconfigured temporary binding relation, wherein the preconfigured temporary binding relation is configured after the server detects a designated operation on a device transaction page; and when there is a temporary binding relation between the device identification and the user identification, bind the device identification and the user identification.

2. The server of claim 1, wherein the processor is further configured to:

when detecting a value transfer operation associated with the smart device, display on the device transaction page a temporary binding triggering option for prompting temporary binding of the device identification and the user identification; and when detecting a selection of the temporary binding triggering option by the user owning the smart device, store the temporary binding relation between the device identification and the user identification.

3. A smart device, comprising:

a processor; and a memory storing instructions executable by the processor, wherein the processor is configured to:

establish a connection with an access point, according to connection information of the access point;

acquire a device identification of the smart device and a user identification of a user owning the smart device; and send the device identification and the user identification to a server through the established connection, the server being configured to bind the device identification and the user identification after determining that there is a temporary binding relation between the device identification and the user identification, wherein the temporary binding relation is configured by the server after the server detects a designated operation on a device transaction page.

4. The smart device of claim 3, wherein in acquiring the user identification of the user owning the smart device, the processor is further configured to:

receive the user identification of the user owning the smart device sent by a terminal via a designated application, the designated application managing multiple detected smart devices.

5. A terminal, comprising:

a processor; and a memory storing instructions executable by the processor, wherein the processor is configured to:

start a designated application when detecting an operation of invoking the designated application;

display a device list via the designated application, the device list including one or more detected smart devices; and send, to a designated smart device, connection information of an access point, when detecting a selection of the designated smart device from the device list, the designated smart device being configured to establish a connection with the access point according to the connection information and send a device identification of the designated smart device and a user identification of a user owning the designated smart device to a server through the established connection, such that the server binds the device identification and the user identification after determining that there is a temporary binding relation between the device identification and the user identification.

* * * * *